Dec. 11, 1962 G. C. BOWER 3,068,135
METHOD FOR MAKING WIRE REINFORCED FABRIC
Filed Feb. 27, 1956
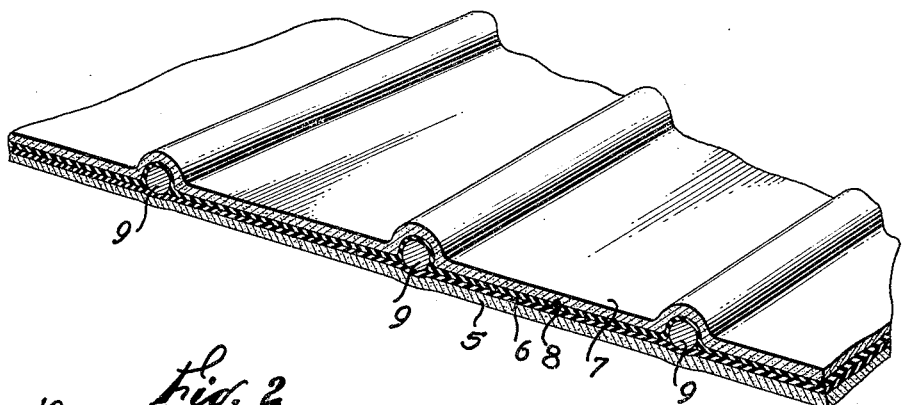
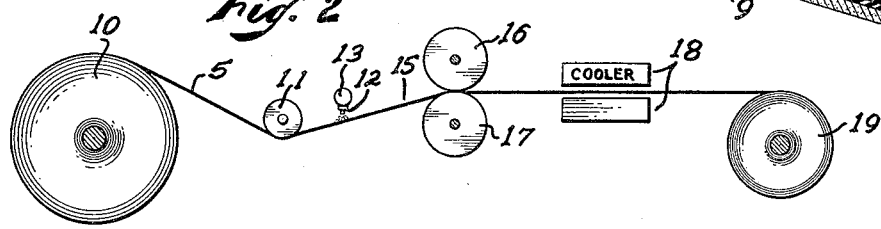
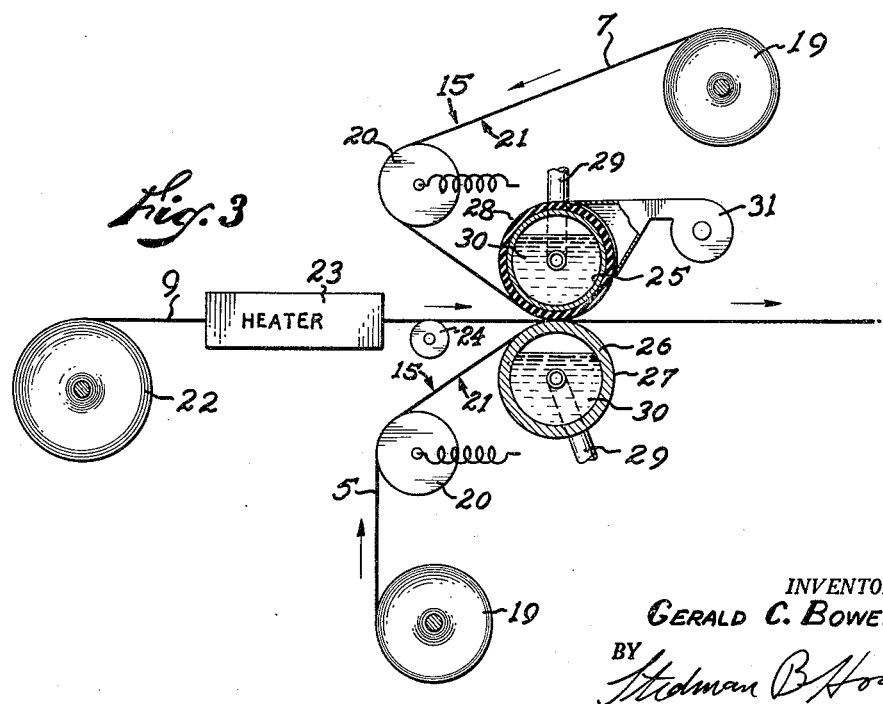
INVENTOR.
GERALD C. BOWER
BY
AGENT.

3,068,135
METHOD FOR MAKING WIRE REINFORCED FABRIC
Gerald C. Bower, Santa Ana, Calif.
Filed Feb. 27, 1956, Ser. No. 568,050
5 Claims. (Cl. 156—179)

This invention relates to a wire-reinforced fabric and the process of its manufacture and more specifically relates to a method of reinforcing with wires a paper or similar fabric coated with polyethylene. The process is described in connection with the manufacture of plant ties, as an example.

Polyethylene coated fabrics have only recently come into commercial use, but have found a great number of uses and advantages. A paper coated with polyethylene is not only waterproof; it is also much tougher than a plain paper or a paper treated with ordinary size. Toughness and durability are much sought-after characteristics, and are enhanced, with respect to many other materials, by the inlaying of fine wires which are bonded to the materials with various adhesives. However, polyethylene does not readily adhere to a hard non-porous surface such as a wire possesses, particularly when in the normal usage of a fabric, such as bending and twisting, the wire "works" in relation to the fabric. To the best of my knowledge, although many attempts have been made to bond wires to polyethylene-coated paper, none has been successful prior to my presently disclosed discovery.

It is an object of this invention to provide a polyethylene-coated paper or like fabric in which wires are embedded and to which the wires are bonded to enhance the tensile strength and the durability under twisting and bending.

Another object of my invention is to provide a wire-reinforced polyethylene-coated paper or like fabric from which the wires will not separate even under the stress of severe twisting and bending.

It is a further object of my invention to provide a simple, economical method of making a wire-reinforced polyethylene-coated paper or like fabric, giving to the finished product a substantially unbreakable bond between the wire and the polyethylene-coated base material.

In the accompanying drawing, illustrative of a product such as I have described and of apparatus for carrying out my process for making the same, FIG. 1 is a greatly magnified sectional view of a paper coated with polyethylene in which wires are embedded, suitable for being cut up into plant ties;

FIG. 2 is a schematic view of apparatus for impregnating a strip of paper with polyethylene, and FIG. 3 is a schematic view of apparatus by which two strips of polyethylene-impregnated paper may be bonded to wires in accordance with my process.

Having reference to the illustrations, a base strip 5 of fabric, which may be paper, is impregnated with polyethylene so that the polyethylene enters the pores of the paper and also leaves a surface coating 6 of polyethylene upon the paper. A similar strip 7 of fabric is impregnated in the same manner with polyethylene, leaving a surface coating 8 of the polyethylene. When the strips 5 and 7 are brought together with the surface layers 6 and 8 in juxtaposition, and wires 9, 9, 9 are placed between them, in accordance with the pressure and temperature conditions hereinafter described, a strongly reinforced product is produced which is highly resistant to ravelling or "bunching" when twisted or bent. It will be appreciated that the product shown in FIG. 1 is greatly exaggerated in size, the impregnated strips 5 and 7 having actually the thinness of paper and the wires 9, 9, 9 being actually only a few thousandths of an inch in thickness.

Such a product may advantageously have the form disclosed in my copending application Serial No. 291,273, filed June 2, 1952, now Patent No. 2,767,113, for plant ties of polyvinyl chloride, as a better bond may be effected if the maximum surface of the very fine wire is bonded to one strip, that strip being also bonded to the other strip. The product may be cut into strips parallel to the wires 9, 9, 9, for use as plant ties, cellophane-bag ties, and similar uses.

The polyethylene-impregnated strips 5 and 7 are obtainable commercially, or they may be easily manufactured as shown in FIG. 2. Some of the commercially available polyethylene papers are coated rather than impregnated, that is to say, the polyethylene resides principally upon the surface, rather than entering the pores of the paper, and it is important for a satisfactory bond that the polyethylene enters into the pores of the paper and does not tend to peel off a tissue-thin surface layer when placed under tension. The strips 5 or 7 may be unwound from a roll 10, passed under a roller 11 and then passed under an extrusion of polyethylene 12 from a nozzle 13, thus receiving the polyethylene only on one side 15. The strips then are passed between heated rolls 16 and 17 which roll the polyethylene thoroughly into the paper, while still leaving the side 15 coated. The coating is then cooled beyond its point of tackiness by passing the paper through a cooler 18, after which it may be rolled on a roll 19 for storage and subsequent use.

The temperature at which polyethylene is tacky and bonds to itself is about 250° F., and at higher temperatures it becomes liquid. The extrusion 12 should of course, be applied at a liquifying temperature. The heated rolls 16 and 17 may be slightly heated to insure that the polyethylene is ductile and will enter the pores of the paper, and the cooler 18 should cool the polyethylene below the tacky temperature of 250° F. As aforesaid, the product at this stage is available commercially, and the foregoing process steps are not deemed to be novel, but care must be taken in purchasing the intermediate material to obtain paper which is both impregnated and coated.

In the manufacture of my finished product, strips 5 and 7 are unwound from rolls 19 and passed over heated rolls 20, 20 with their uncoated sides 21, in contact with the heated rolls. The rolls 20, 20 heat the polyethylene impregnation of the strips 5 and 7, to a temperature in excess of 250° F., which generally requires that they heat the uncoated paper side 21 to about 400° F. The excess of heat in the paper helps assure that the polyethylene will not cool below 250° F., until such cooling is intended, but care must be taken that the paper does not char. One or more wires 9 are unwound from spools 22 and passed through a heater 23 which heats them to a temperature above the tacky temperature of polyethylene, say to about 300° F. If more than one wire is in use, the numerous wires 9 may pass through a comb or a grooved roller 24 to space them as desired in the finished product. The wires 9 are then brought between pressing and cooling rolls 25 and 26 with the paper strips 5 and 7 on opposite sides of them, the coated sides 15 of the strips being next to the wires.

The rolls 25 and 26 press the paper strips 5 and 7 together so as to imbed the wires 9 in one of them, say, the strip 7, while leaving the other strip, 5, merely tangent to the wires 9, as disclosed in my aforementioned application Serial No. 291,273. The roll 26 has a smooth hard surface 27. The roll 25 has a surface of rubber 28 or like material, capable of being resiliently impressed by the paper-covered wires 9. The strip 5 retains the smoothness of the surface 27 with which it is in contact, while the strip 7 is creased into the resilient surface 28, the wires 9 being embedded in the strip 7 and only protruding therefrom enough to be tangent to the strip 5.

The heated and tacky polyethylene coating on the strips 5 and 7 will not bond to the wires 9, and if the product is removed from the pressure of the rolls 25 and 26 while the polyethylene is still tacky it will separate, leaving the wires 9 in their original uncoated condition. It is of no avail to give the wires 9 a preliminary coating of a cementitious material, as described in my afore-mentioned application Serial No. 291,273, because the cementitious material will not adhere to the coating of the strips 5 and 7. I have found, however, that if the wires 9, 9, 9 are heated so that the also-heated polyethylene flows toward them and makes intimate contact with them, under pressure, an initial and momentary bond between them may be established, and that if the polyethylene coating of the strips 5 and 7 is chilled to below its tacky temperature immediately upon making contact with the hot wires 9, being above that temperature and therefore tacky up to that instant, and if the hot wires 9 are also chilled at the same instant, the polyethylene coating will "set" upon the wires 9 and bond them permanently to the strip 7 and the strip 5 and also bond the strips to each other. Accordingly the rolls 25 and 26 are made hollow and are filled through axial pipes 29 with a refrigerant 30. As the refrigerant will act only slowly through the rubber cover 28 of the roll 25, that surface is also preferably air-cooled by air from a blower 31. The cool roll surfaces 27 and 28 chill the polyethylene coating during the moment that they press together the combined wires 9 and strips 5 and 7, and of course chill the nipped hot wires 9, also. It will be seen that the pressure is exerted during a very short moment of time, which is however divided into an instant when the strips and wires are hot and a subsequent instant when the strips and wires are cooling. It will be understood that with the thin paper and very fine wires used for plant-ties, the mass of the hot material nipped at any instant between the rolls 25 and 26 is extremely small compared to the mass of the rolls, and its B.t.u. content, even at a temperature of around 300° F., is likewise extremely small. It is not difficult, with one chilled roll surface 27 a good conductor and the other roll surface 28 cooled by cold air externally as well as cooled internally by a refrigerant, to effect a practically instantaneous drop of 100° F., from a temperature of about 300° to a temperature of about 200°, which affords an ample margin above and below the temperature at which the polyethylene "sets." While a longer chilling period can be obtained by slowing down the rolls 25 and 26, it is important to keep them rotating at a rate at which the conductivity of the wires 9 will not cause the wires to cool below the "setting" temperature before they enter the rolls and are pressed between the hot strips 5 and 7. The initial heating of the wires 9 to a higher temperature than the temperature of the polyethylene coatings with which it makes contact is for the three-fold purpose of allowing for the greater conductivity of the wire, allowing for heat-losses in the comb or roll 24, and allowing for a plus margin of temperature at the rolls 25 and 26 to cause the polyethylene to flow towards the wire.

It will be noted from FIG. 3 that the finished product is drawn from the rolls 25 and 26 in a straight line tangent to both rolls and is not bent or wrapped around either roll. This is for the purpose of maintaining the precise relative positions of the wires and the paper strips at the instant and place that the polyethylene sets. Relaxation of pressure and/or a very slight bend while the polyethylene is still tacky will often result in separation of wire and fabric.

In the foregoing description, the temperature at which polyethylene "sets," or loses its capability of forming a bond, has been described as being about 250° F. It is to be understood that this temperature is about the median of a range of temperature at which different batches of polyethylene or of commercial polyethylene-coated papers appear to "sets," and it is not to be taken as a critical point, but rather as a temperature about which a range of temperautres may be constructed in commercial operations. The apparatus for carrying out my process, as herein described, should be preferably made capable of heating to above 300° F., and of cooling substantially instantly to 200° or below, when handling very thin material to be cut into plant ties. With heavier materials, presenting problems in insulation and conductivity, a greater range may be necessary.

I claim:

1. The method of causing a wire to bond to a polyethylene-impregnated fabric which consists in: heating the fabric to a temperature in the range 250–400 degrees Fahrenheit in order to soften the polyethylene impregnation to a tacky consistency; heating the wire to at least as high a temperature as that of the polyethylene impregnation; pressing the hot wire into the fabric; and immediately and while still under pressure reducing the temperature of the fabric and of the wire to a temperature at which the polyethylene impregnation loses its tacky consistency without permitting either the fabric or the wire to bend.

2. The method of making a polyethylene-impregnated wire-reinforced fabric which comprises: impregnating one side of the fabric with polyethylene under pressure and heat to cause the polyethylene to enter the pores of the fabric; pressing a wire laterally into said one side of said fabric at a pressure sufficient to embed said wire in said fabric and at a temperature of both said wire and said fabric above 250 degrees Fahrenheit but below the charring temperature of said fabric; and cooling said wire and said fabric to a temperature at which said polyethylene sets while maintaining by pressure upon both said wire and said fabric the position of said wire relative to said fabric.

3. The method of bonding a wire reinforcement to a paper impregnated on one side with polyethylene which comprises: heating said paper from the unimpregnated side thereof to a temperature at which the polyethylene becomes bond-forming; heating a wire to a higher temperature than the resultant temperature of said polyethylene; pressing said wire into lateral contact with the impregnated side of said paper at a pressure sufficient to embed said wire in said polyethylene; and rapidly cooling said wire to a temperature sufficiently low to set the wire-surrounding polyethylene while holding said wire and said paper under pressure and without curvature of either said wire or said paper.

4. The method, as set forth in claim 3, in which the resultant temperature of said polyethylene is approximately 250 degrees Fahrenheit, and said wire is heated to approximately 300 degrees Fahrenheit.

5. The method of bonding a wire reinforcement to fabric which has been impregnated upon one side with polyehylene, which comprises: heating the unimpregnated sides of two strips of said fabric to a temperature in excess of 250 degrees Fahrenheit and not over 425 degrees to produce on the impregnated sides of said strips a temperature at which polyethylene becomes tacky and will form a bond when subsequently cooled; heating a wire to a temperature sufficiently higher than the temperature of said impregnated sides to cause an exchange of heat from said wire to said polyethylene and a flow of said polyethylene toward said wire; pressing said two strips, with their impregnated sides in juxtaposition, upon opposite sides of said wire while in said heated condition; and instantly and while still under pressure cooling said strips and the interposed wire while said strips and said wire are held rectilinearly.

(References on following page)

References Cited in the file of this patent

UNITED STATES PATENTS

| | | |
|---|---|---|
| 1,327,281 | Jenkins | Jan. 6, 1920 |
| 2,290,386 | Schindler | July 21, 1942 |
| 2,551,591 | Foord | May 8, 1951 |
| 2,688,582 | Phair et al. | Sept. 7, 1954 |
| 2,697,058 | Lasak | Dec. 14, 1954 |
| 2,728,703 | Kiernan et al. | Dec. 27, 1955 |
| 2,742,391 | Warp | Apr. 17, 1956 |

FOREIGN PATENTS

| | | |
|---|---|---|
| 150,288 | Australia | June 14, 1951 |
| 726,949 | Great Britain | Mar. 23, 1955 |